Figure 1:
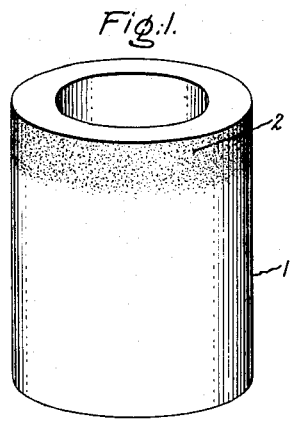

Jan. 26, 1954  H. J. NOLTE  2,667,427
METHOD OF METALIZING A CERAMIC MEMBER
Filed July 27, 1951  4 Sheets-Sheet 1

Inventor:
Henry J. Nolte,
by *Prowell P. Mack*
His Attorney.

Jan. 26, 1954     H. J. NOLTE     2,667,427
METHOD OF METALIZING A CERAMIC MEMBER
Filed July 27, 1951     4 Sheets-Sheet 2

(1) 35% MnMo FIRED ON ALUMINA CERAMIC AT 1400 °C.
(2) Ni AND Cu PLATINGS FIRED ON AT 1000 °C.
(3) 44% Ni IRON BRAZED TO METALLIZED CERAMIC WITH 72% Ag + 28% Cu AT 900 °C.

Inventor:
Henry J. Nolte,
by  ̸ ̸ ̸ ̸ ̸
His Attorney.

35% MnMo FIRED ON ALSIMAG 243 (FORSTERITE CERAMIC) AT 1300 °C

Jan. 26, 1954 H. J. NOLTE 2,667,427
METHOD OF METALIZING A CERAMIC MEMBER
Filed July 27, 1951 4 Sheets-Sheet 4

35% MnMo FIRED ON ALSIMAG 243 (FORSTERITE CERAMIC) AT 1000 °C

Inventor:
Henry J. Nolte,
by Powell S. Mack
His Attorney.

Patented Jan. 26, 1954

2,667,427

UNITED STATES PATENT OFFICE 2,667,427

METHOD OF METALIZING A CERAMIC MEMBER

Henry J. Nolte, Schenectady, N. Y., assignor to General Electric Company, a corporation of New York Application July 27, 1951, Serial No. 238,871

8 Claims. (Cl. 117—22)

My invention relates to improved methods of applying an intimately bonded layer of metal to a ceramic surface and to improved metalized ceramic members. The invention relates particularly to methods of producing such metalized members of a character and quality suitable for the fabrication of vacuum-tight metal to ceramic bonds.

This application is a continuation-in-part of my application Serial No. 722,029, filed January 14, 1947, now abandoned, and a divisional application Serial No. 71,893, filed January 21, 1949, both assigned to the same assignee as this application.

Ceramic materials have a number of properties which render them suitable for many applications requiring the bonding together of a number of ceramic or ceramic and metal members in vacuum-tight relation. The difficulty of producing such bonds in the past has greatly restricted the use of ceramic materials. As electric discharge devices, for example, have been employed for higher frequencies the demand has greatly increased for insulating materials which may be hermetically sealed to metal members to form a composite vacuum-tight envelope and which at the same time have low dielectric losses and retain their physical and electrical properties at high temperatures.

In accordance with important aspects of my invention, I provide improved metalized ceramic members and methods of producing such members which render it possible to fabricate more simply and more positively the metalized parts in vacuum-tight relation.

In accordance with a preferred embodiment of my invention the ceramic member to be metalized is coated with a mixture of powders, one of which is selected from the group consisting of molybdenum, tungsten and iron and the other of which is manganese.

In accordance with prior art processes for bonding to ceramics, the metal coating has been made to adhere to the ceramic by interposing a surface-applied layer of a glaze or in some cases a very finely-divided metal powder has been sintered onto the ceramic in a very carefully-controlled atmosphere. The present invention involves the discovery that metallic or elemental manganese when applied to a ceramic surface along with a refractory metal selected from the group consisting of molydenum, tungsten, and iron provides a bond of unusually good quality characterized by its reproducibility, and strength as compared with the metalizing produced by the prior art processes. The control required for successful metalizing is less critical than prior art processes and the need for very finely-divided metal powders is eliminated.

As will be described in more detail in connection with a preferred embodiment of my invention, the metalizing of ceramics to be bonded together or to metal members is preferably carried out as a separate step. It is possible, however, within the scope of my invention to accomplish the metalizing and bonding together in a single step in which case a solder metal in addition to the manganese and the metal selected from the group including molybdenum, tungsten and iron is employed. It is apparent that the introduction of the solder at the same time to provide a process with only one heating step renders the process somewhat more difficult to control for different sets of conditions; that is different ceramic compositions, heating times, temperatures and the like.

My invention will be better understood by a consideration of some specific examples of metalizing and bonding operations carried out in accordance therewith.

In applying a coating to a ceramic member of the type, known as forsterite ceramics, which is predominantly of the chemical and mineral composition $2MgO \cdot SiO_2$, the process may be carried out as follows. A mixture of powdered manganese metal and a metal selected from the group consisting of molybdenum, tungsten and iron, and for the purposes of this example molybdenum is used, is mixed together for example by ball milling with a suitable liquid carrier such as acetone, amyl acetate or the like with or without a suitable binding agent such as cellulose nitrate. The process is not dependent upon the use of very fine powders and the manganese powder may be 150 to 325 mesh, for example, and the molybdenum powder may be above 325 mesh. The viscosity is adjusted to the best consistency for spraying or brushing and the suspension applied to the area of the ceramic body to be metalized. The manganese may comprise 10% by weight of the manganese molybdenum mixture. The coated ceramic body is then heated in a non-oxidizing or an inert atmosphere sufficiently reducing to prevent oxidation of the molybdenum preferably in a conventional hydrogen atmosphere furnace. The hydrogen may be commercial hydrogen available in most manufacturing plants with a dew point of $+45°$ F., for example. Extremely dry hydrogen is not required but a dew point of −55° F., for example has been found entirely satisfactory.

The coated ceramic body is heated to a temperature of 1350° C., for example, for a period of thirty minutes. After this has been accomplished, the metals appear as a very tightly-adhering coating on the surface of the ceramic. The sintered and bonded molybdenum layer, like ordinary molybdenum or tungsten is not easily wetted by brazing materials; therefore, further treatment of this surface may be necessary before brazing. If silver solder is to be used, the metalized areas should be nickel-plated first, and then copper-plated. Very satisfactory plating is obtained by electrolytically plating each layer for 10 minutes at 2 volts. Then, these platings should be sintered again preferably in hydrogen for 10 minutes at 1000° C. If copper brazing is to be done, the treatment is the same, except that the nickel plating may be omitted. In the one step process no plating is required.

In the specific example given above, 10% manganese was used with a heating time of thirty minutes at a temperature of 1350° C. The optimum amount of manganese employed varies with other factors in the process. For example, for a given firing temperature, an increase in the amount of manganese will allow a shorter firing time or for the same firing time will permit a lower firing temperature. As an illustration, with the same ceramic material mentioned above and with 20% manganese and 80% molybdenum and a temperature of 1350° the firing time may be reduced to 15 minutes. Similarly with 50% manganese and 50% molybdenum the firing temperature may be reduced to 1250° and the heating time may be 15 minutes. With percentages of manganese as high as 50% by weight of the manganese molybdenum mixture, adequate wetting by the plating and solder metals may be difficult to obtain. Also with 20% manganese at a 30 minutes' firing time, the firing may be carried out at a temperature of 1250° C.

In addition to the above, the character of the ceramic alters the percentage of manganese for given conditions of temperature and firing time. An inert refractory such as the high alumina bodies requires a higher percentage of manganese for a given firing temperature and firing time than the more active bodies such as the magnesium oxidesilica dioxide bodies described in the example above or some of the zirconium oxide-containing bodies.

In addition to the considerations already pointed out, it should be mentioned that for a given ceramic an amount of manganese less than the optimum requires a longer firing time or higher firing temperature. If the percentage of manganese is too great, then, as will be more fully explained at a later point in the specification, good wetting of the metalized layer by the plating medium is difficult or impossible to obtain.

In the above examples the firing temperature for the metalized coating has been specified as 1250° C. and 1350° C. As pointed out above, the temperature is one of a number of variables and under certain combinations of other conditions and for most ceramic materials with the multistage firing process temperatures in the range of 1200° C. to 1400° C. may be used. In general it may be said that temperatures above the sintering of the metal manganese mixture and well below the softening points of the ceramics are desirable.

In the specific examples mentioned above, percentages by weight of the manganese as a part of the powdered metal mixture has been within the range of 10% to 50%. The 50% figure is high for most combinations of circumstances, and a preferable range for most metalizing operations would fall within the range of 10 to 35%.

Molybdenum has been described in the specific examples given as the refractory metal used. Molybdenum is the preferred metal but tungsten operates in the process in substantially the same manner and may be substituted in whole or in part for the molybdenum. Iron also acts in a similar way but is, on the whole, probably less desirable. Limited substitution of iron for the molybdenum requires a smaller amount of manganese to secure satisfactory metalizing for a given set of conditions; that is, the same conditions of time, temperature and the like.

Figure 2:
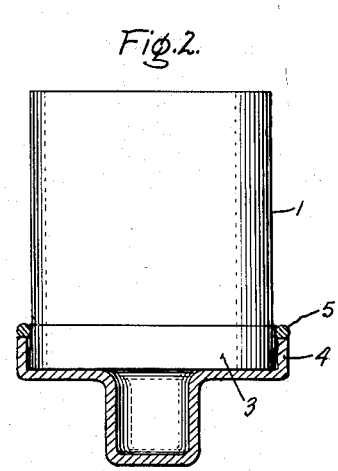
Figure 3:
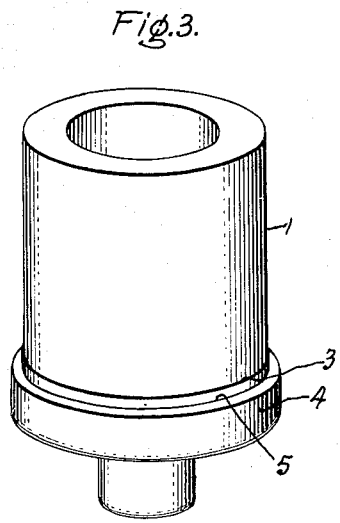
Figure 4:
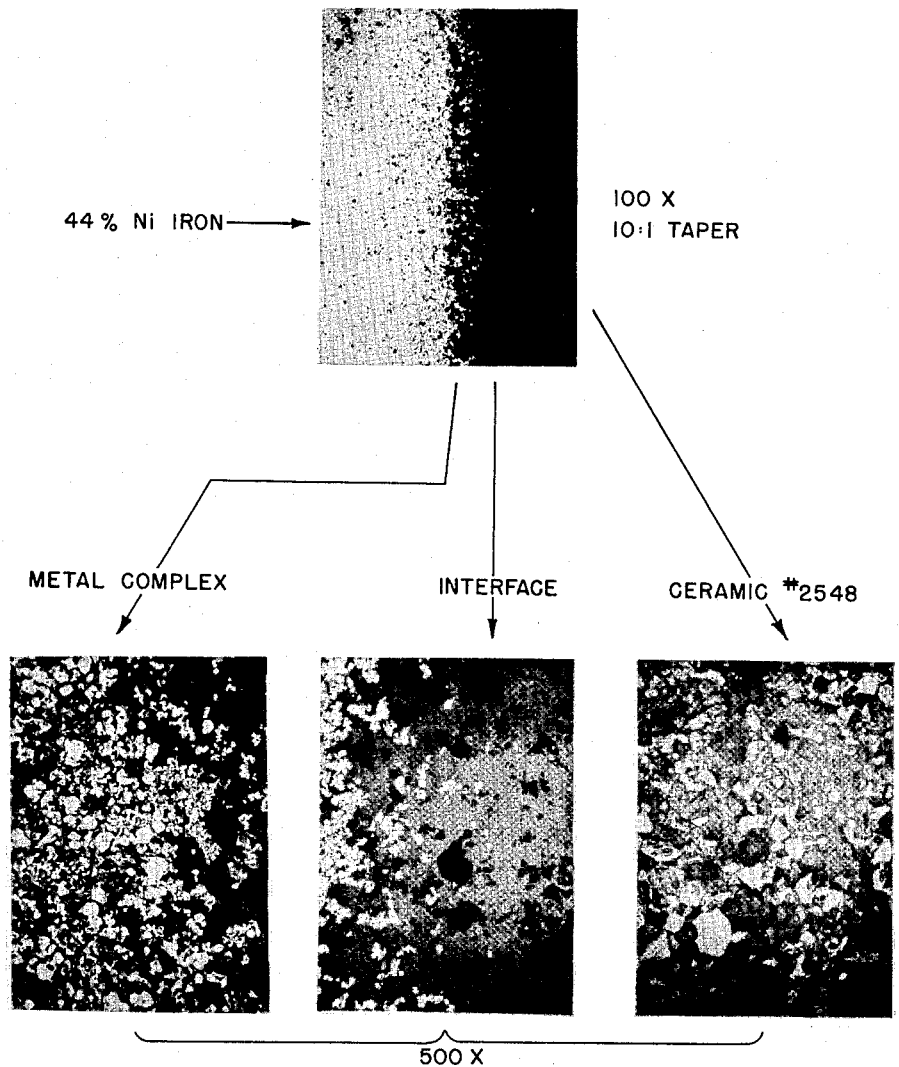
Figure 5:
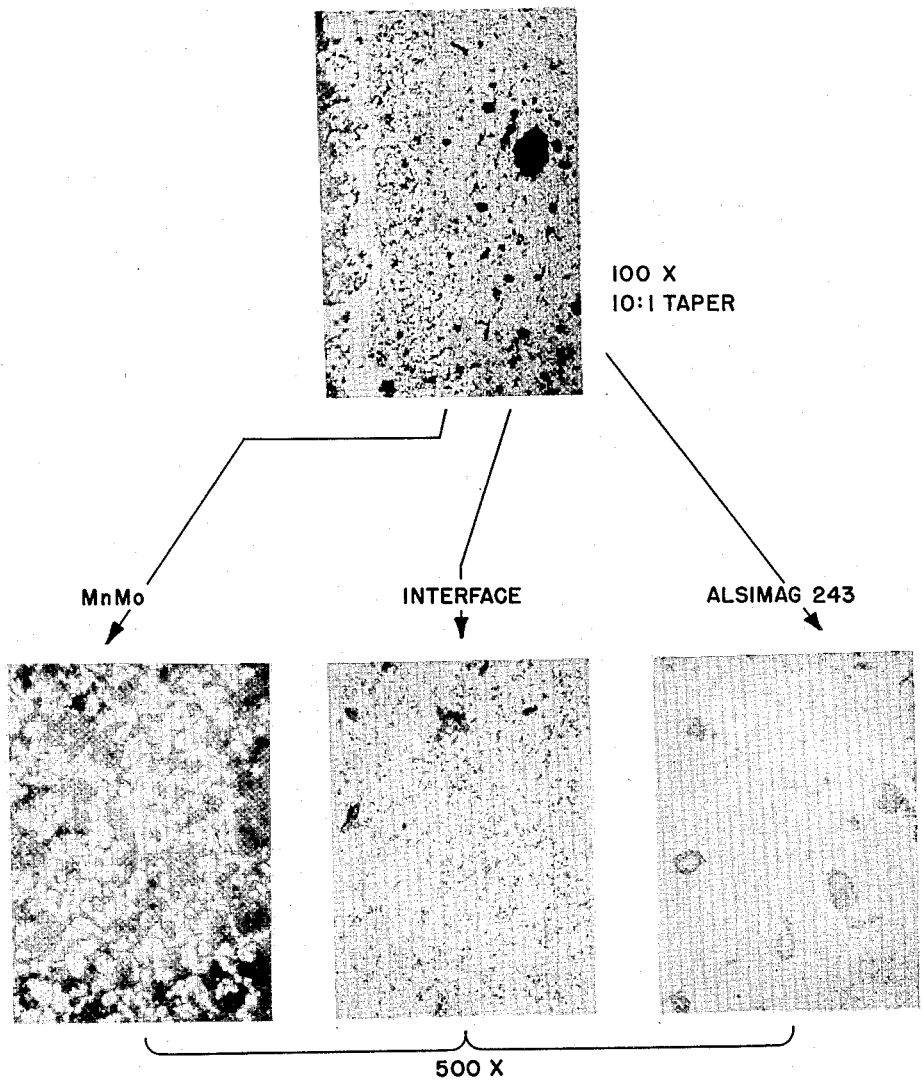
Figure 6:
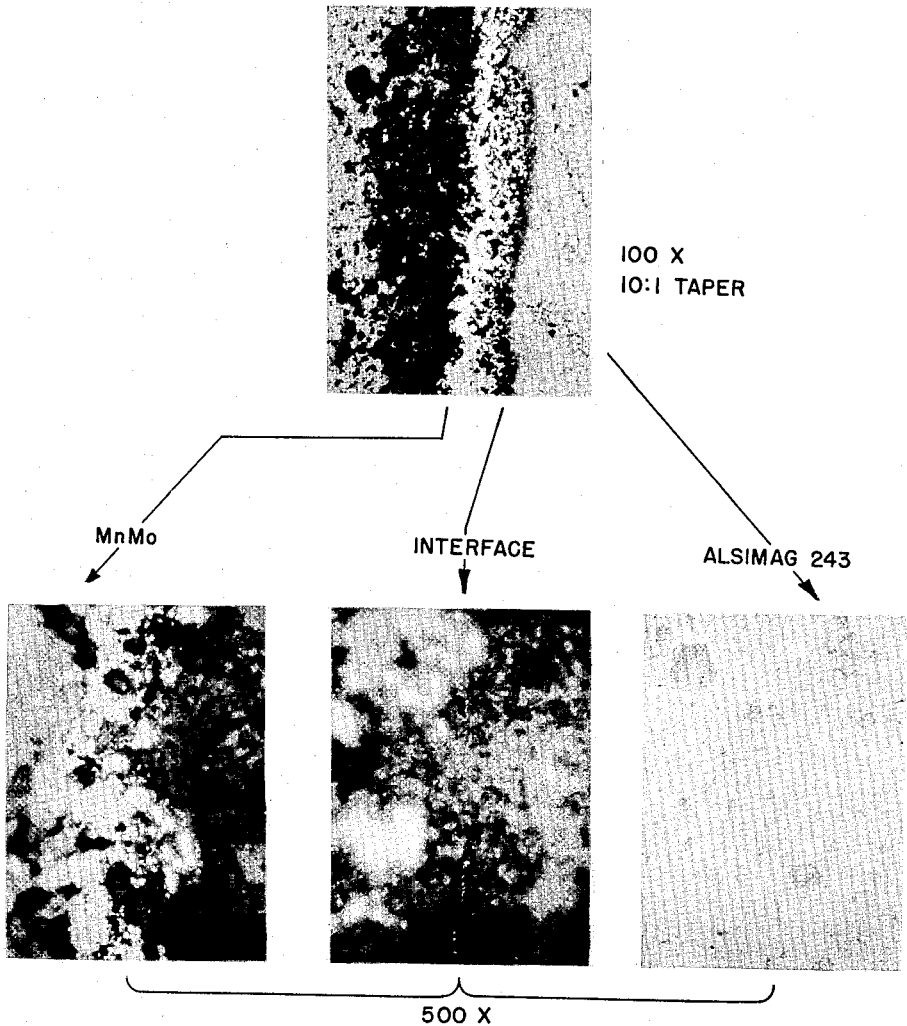

The application of my invention to the fabrication of a composite metal and ceramic body will now be described, reference being had to the drawing in which Fig. 1 is a perspective view of a ceramic cylinder metalized in accordance with my invention, Fig. 2 is an elevational view showing the cylinder of Fig. 1 with a metallic end cap in position for brazing thereto, Fig. 3 shows the assembly of Fig. 2 after brazing, and Figs. 4, 5, and 6 show enlarged photographs of metalized ceramics processed in accordance with the present invention.

Referring now to the drawing, a ceramic cylinder 1 is provided with a tightly-adhering metal band 2. While the ceramic may be any one of the commercially-available ceramic compositions, the ceramic composition known commercially as "Alsimag 243" and consisting almost exclusively of the mineral forsterite, $2MgO\ SiO_2$, has a very desirable combination of mechanical and electrical properties for use in electronic devices, such as electronic tubes. With such a ceramic composition, the metal band is applied by first preparing a mixture of metal powders, one of which is metallic manganese and the other of which is selected from the group consisting of molybdenum, tungsten and iron or combinations. The metal powders are mixed together in the desired proportions and with a suitable binder and solvent such as a cellulose nitrate binder and amyl acetate or acetone. For an average batch of about one pound of metal powders, 24 hours' milling in a one-gallon ball jar has been found to be sufficient. This viscosity adjusted mixture of powders and liquid may be painted or sprayed on the area to be metalized and the resulting coated body fired in an atmosphere non-oxidizing with respect to molybdenum, tungsten or iron but may cause nearly complete oxidation of the manganese metal to manganous oxide MnO. As previously stated, the heating may be carried out in an ordinary hydrogen furnace and for a sufficient length of time and at a temperature sufficient to react the coating with the ceramic and render the metalized coating tightly adhering. When extremely dry hydrogen or a vacuum is employed, the manganese metal is oxidized by oxygen available in the processed parts, particularly the ceramic. The coating is applied in a thin layer and I have found that a thickness in the order of .001 to .002 inch is preferred. For the particular ceramic mentioned above, satisfactory metalizing has been accomplished by powder mixtures in which the percentage of manganese by weight of the mixture constituted from 10 to 50% and which the firing temperature had values of from 1250 to 1350° C. and in which the firing time had values of 15 to 60 minutes. The specific combinations of manganese percentage, firing temperature, and firing times are set out in the table below:

| Percentage Manganese | Firing Temperature, °C. | Firing Time in Minutes at Indicated Temp. |
|---|---|---|
| 10 | 1,350 | 30 |
| 10 | 1,250 | 60 |
| 20 | 1,250 | 30 |
| 20 | 1,350 | 15 |
| 50 | 1,250 | 15 |

The total firing time will, of course, be affected to some extent by the size of the ceramic. A cylinder prepared in the manner described above has a somewhat porous metalized surface which is preferably prepared for brazing, by first adding metal to the metalized coating as shown at 3, by two coating steps. This may be done to advantage by electroplating methods and I have found that a particularly effective result is obtained by first plating on a layer of nickel and then a layer of copper. After the plating the coated ceramic is again fired in a hydrogen furnace for a period in the order of 10 minutes at a lower temperature, preferably at about 1000° C., sufficient to make the platings more abrasion resistant, but not to melt either plating metal.

After plating and firing, the metalized ceramic is ready for brazing to a metal member or to another ceramic member similarly metalized. In the illustrated embodiment, the cap 4 is placed in position on the metalized cylinder and a ring or ribbon of solder 5 is placed in position (essentially in contact) to flow over the metalized surface and the opposed surface of the cap 4. A copper silver alloy may be used to advantage and the cap 4 may be of copper-clad stainless steel with a thermal contraction approximating that of the ceramic over the entire temperature interval between brazing and room temperatures.

In the foregoing description, a number of examples have been given to provide illustrations of how the various controllable conditions of the process may be varied and how the permissible limits of these conditions depend on one another and on the type of ceramic employed. While these illustrations serve as a very practical guide to the successful carrying out of applicant's method, applicant has also produced a novel structure in this metalizing operation and by the use of photomicrographs the existence of this structure may be readily detected and in this way the characteristic of the bond obtained for a given set of conditions may be readily determined.

It is important to the successful carrying out of the present invention that the manganese react with the ceramic sufficiently to form a manganese-modified composition on the surface of the ceramic member which is liquid at the sintering temperature of the metalizing process. In Figs. 4, 5, and 6, there are shown three sets of photomicrographs of specimens prepared with different ceramics or different process conditions. In each of these figures, the upper picture is a tapered section of a metalized ceramic magnified 100 times. The taper angle is 5° 43′ providing an apparent magnification of 10 to 1; that is, the section traverses 10 times as much distance along the metalized ceramic as it does into the metalized ceramic. This provides an apparent total magnification of 1000 times.

In Fig. 4, the bond was prepared by metalizing an alumina ceramic by heating at a temperature of 1400° C. in a hydrogen furnace for a period of ½ hour and with a 35% manganese molybdenum mixture as the metalizing coating, that is the manganese was 35% by weight of the manganese molybdenum powders used. The metalized coating was plated with nickel and copper and then fired in hydrogen at 1000° for a period of 10 minutes. Subsequently, a 44% nickel iron member was brazed to the metalized ceramic with a 72% silver +28% copper brazing material in a hydrogen furnace at 900° C.

In the lower three pictures, particular regions of the bond shown in the upper figure have been enlarged to 500 times which together with the 10 to 1 taper make an apparent magnification of 5000 times. The left-hand view shows the predominantly metal layer appearing on the surface of the ceramic adjacent the nickel iron member. This metal complex includes molybdenum or manganese molybdenum alloy together with some of the brazing metal, and the nickel and copper of the platings. On the right-hand side of this photograph is shown a portion of the manganese-modified material which was in a liquid state during this first sintering operation of the metalizing process and which solidified as the temperature decreased following the sintering. The central picture shows particularly this solidified layer or interface. The presence of the manganese renders the surface layer lower melting and provides this liquid layer which is capable of cooling to a non-crystalline glassy structure. In the case of an alumina body, the liquid does tend to cool to a glassy material. The photo at the lower right shows the appearance of the ceramic at a greater distance from the outer surface and shows a more highly crystalline structure of the ceramic which has been slightly modified by the action of the manganese.

The presence of a liquid layer of a manganese-modified composition on the surface of the ceramic body during sintering is conducive to a strong bond for a number of reasons which may be described briefly as follows:

This layer reacts with and permeates both the ceramic and the metalizing, forming both chemical and mechanical bonds, and in reacting with the ceramic it roughens its surface and provides larger contact areas and deeper indentations for gripping or bonding. This liquid layer also helps to withdraw any manganese oxide particles with their dissolved impurities from the metalizing layer, thereby permitting stronger sintering of the molybdenum particles and a more metallic surface layer for better wetting and solder flow during the brazing operation. The glassy layer also tends to dissociate and yield oxygen which, in trickling out through the metalizing layer, forms low melting molybdenum oxides (substantially lower melting than molybdenum metal). These oxides move as liquid and gas into the liquid manganese-modified ceramic composition, and are then re-reduced to deeply entrenched metallic particles, chemically bonded to the ceramic structures by continuous transition layers. The metal particles such as the molybdenum penetrate into the liquid layer during the sintering process and an examination of samples and the photographs indicates that the molybdenum is assisted in this penetration by an adherent coating of manganese oxide formed from the original manganese molybdenum mixture. Also the manganese content of the liquid-modified ceramic acts as a "catalyst" to accelerate recrystallization and a strong interlocking structure to the surface layers of the ceramic.

The outer or metalized surface of the ceramic member can be seen to be a strong sintered structure which has formed at a lower temperature than molybdenum would sinter in the absence of manganese. The particles of manganese oxide formed by the initial reactions with water present (which may to advantage come from the slight amount of moisture present in the commercial hydrogen) move almost completely out of the metalizing layer and into the modified ceramic interface. The pore spaces left behind by this moving out are filled by the growth of molybdenum particles and their shrinking together and also by the nickel and copper of the platings and the solder metal. Manganese metal which is not oxidized to manganese oxide or is reproduced by reduction, alloys with the molybdenum or with the solder metal to form desirable ductile particles.

Underfired metalizing can be recognized by the presence of green-grey lumps of manganese oxide slag dispersed throughout the metal particles of the metalizing layer and overfired metalizing can be recognized by the excessive seepage of the manganese-modified ceramic of the liquid layer into the metalizing and through the metal particles even to the top surface to the point where it inhibits the plating and the flow of solder over the metalizing. Also with overfired metalizing, parting is apt to occur within the disintegrated surface layers of the ceramic rather than at the metalizing-ceramic interface.

In Fig. 5, are shown four views corresponding to the pictures of Fig. 4 but showing a metalized surface on a forsterite ceramic body having the general formula $2MgO \cdot SiO_2$ This ceramic is one of the most widely used in vacuum-tube work because of its low dielectric loss characteristic and its desirable metal matching thermal expansion characteristics, particularly for metals of the chrome iron class. With the forsterite body, the manganese-modified ceramic which forms as a glassy layer has much greater tendency to recrystallize during further processing than the glassy layer formed on the alumina bodies. A strongly-bonded metalized layer results, however, if this melt or glassy liquid layer is formed at the sintering temperature.

Fig. 6 shows, for comparison, an underfired specimen of forsterite with the process being carried out at 1000° C. instead of at 1400° C., the temperature used in preparing the specimen shown in the photographs of Fig. 5. In this underfired specimen it is apparent that there is an abrupt dividing zone between the ceramic and metalizing in contrast to the relatively jagged, interlocked boundry formed in the mature fired specimen of Fig. 5 in which the metal particles can be seen well within the ceramic. The conditions of time for the specimens of Figs. 5 and 6 are the same as those for Fig. 4.

The above-detailed discussion has been included in the specification to put the production of satisfactory metalizing in accordance with applicant's invention on a more scientific and controllable basis as well as to disclose the nature of the process required for successful metalizing. The above discussion considered together with the various specific examples given to illustrate practical limits on the bonding process for particular materials will serve to demonstrate the scope of the present invention and provide a practical guide for detecting the cause of any failure to obtain the desired quality of metalizing.

As will be readily appreciated by those skilled in the art, in making bonds to the metalized layers, due consideration should be given to the degree of mismatch between the thermal expansion characteristics of the ceramic and the metal members as well as to the actual design of the seals to minimize difficulties resulting from this cause.

While specific embodiments have been shown and described, it will, of course, be understood that various modifications may be made without departing from my invention in its broader aspects, and the appended claims are, therefore, intended to cover any such changes and modifications as fall within the true spirit and scope of my invention.

What I claim as new and desire to secure by Letters Patent of the United States is:

1. The method of metalizing a surface of a ceramic member which comprises applying to said surface a mixture of powders consisting essentially of elemental manganese and a metal selected from the group consisting of molybdenum, tungsten and iron and mixtures thereof, the manganese comprising from 10% to 50% by weight of said mixture of metal powders, heating the member and applied mixture of powders in an atmosphere non-oxidizing to said metal to a temperature of 1200° to 1400° C. to cause the manganese to form with the ceramic and the metal of said group a tightly adhering metal coating, the lower percentages of manganese being used with the more active ceramics and higher temperatures.

2. The method of metalizing a surface of a ceramic member which comprises applying to the said surface a mixture of powders consisting essentially of elemental manganese and a metal selected from the group consisting of molybdenum, tungsten and iron and mixtures thereof, the manganese comprising 10% by weight of said mixture of metal powders, heating the member and applied powders in an atmosphere non-oxidizing with respect to said metal to a temperature of 1200° to 1400° C. to cause the manganese to form with the ceramic and the metal of said group a tightly adhering metal coating.

3. The method of metalizing a surface of a ceramic member which comprises applying to said surface a mixture of powders consisting essentially of elemental manganese and a refractory metal selected from the group consisting of molybdenum, tungsten and iron and mixtures thereof, the manganese comprising from 10 to 50% by weight of said mixture of metal powders, heating the coated member in an atmosphere non-oxidizing to said metal to a temperature above the sintering temperature of manganese and below the softening point of the ceramic to cause the manganese to form with the ceramic and the metal of said group a tightly adhering metal coating.

4. The method of metalizing a surface of a ceramic member which comprises applying to the surface a mixture of powders consisting essentially of elemental manganese and molybdenum, the manganese comprising from 10% to 50% by weight of said manganese molybdenum mixture, heating the coated member in a hydrogen atmosphere to a temperature of 1200° to 1400° C. to form on said ceramic a tightly adhering metal coating.

5. The method of metalizing a surface of a ceramic member which comprises applying to the surface a mixture of powders consisting essentially of elemental manganese and molybdenum, the manganese comprising 10% by weight of said manganese molybdenum mixture, heating the coated member in a hydrogen atmosphere to a temperature of 1200° to 1400° C. to form on said ceramic a tightly adhering metal coating.

6. The method of metalizing a surface of a ceramic member which comprises applying to said surface a mixture of metal powders consisting essentially of elemental manganese and molybdenum, the manganese comprising from 10% to 50% by weight of said mixture of metal powders, heating said member and the applied mixture of powders in a hydrogen atmosphere to a temperature between 1200° C. and 1400° C. to sinter the manganese molybdenum metal coating and provide a liquid layer of manganese modified ceramic composition between the manganese molybdenum layer and the ceramic body to produce a strong mechanical and chemical bond between the molybdenum metal layer and the ceramic member.

7. The method of metalizing a surface of a ceramic member which comprises applying to said surface a thin coating of a mixture of metal powders consisting essentially of elemental manganese and a refractory metal selected from the group consisting of molybdenum, tungsten, iron and mixtures thereof, the manganese comprising from 10% to 50% by weight of said mixture of metal powders, heating said member and the applied mixture of powders in an atmosphere non-oxidizing with respect to the refractory metal to sinter said coating of metal powders and provide a liquid layer of manganese modified ceramic composition between the manganese refractory metal coating and the ceramic body to produce a strong mechanical and chemical bond between the metal layer and the ceramic member, the time and temperature of heating being insufficient to soften the ceramic member but sufficient to produce the modified ceramic composition at the outer surface of the metal coating.

8. The method of metalizing a surface of a ceramic member which comprises applying to said surface a thin coating of a mixture of metal powders consisting essentially of elemental manganese and a metal selected from the group consisting of molybdenum, tungsten, iron and mixtures thereof, the manganese comprising from 10% to 50% by weight of said mixture of metal powders, heating said member and the applied mixture of powders in a hydrogen atmosphere to a temperature between 1200° C. and 1400° C. for a period of from fifteen minutes to one hour to sinter said coating of metal powders and provide a liquid layer of manganese modified ceramic composition between the metal coating layer and the ceramic body to produce on cooling a strong mechanical and chemical bond between the manganese molybdenum layer and the ceramic member.

HENRY J. NOLTE.

References Cited in the file of this patent

UNITED STATES PATENTS

| Number | Name | Date |
|---|---|---|
| 2,282,106 | Underwood | May 5, 1942 |
| 2,555,877 | Doran | June 5, 1951 |

FOREIGN PATENTS

| Number | Country | Date |
|---|---|---|
| 474,064 | Great Britain | Jan. 17, 1936 |
| 475,935 | Great Britain | Nov. 26, 1937 |